March 10, 1925.  1,529,622
R. HALEY
SECTIONAL MOLD
Filed Feb. 14, 1922  2 Sheets-Sheet 1
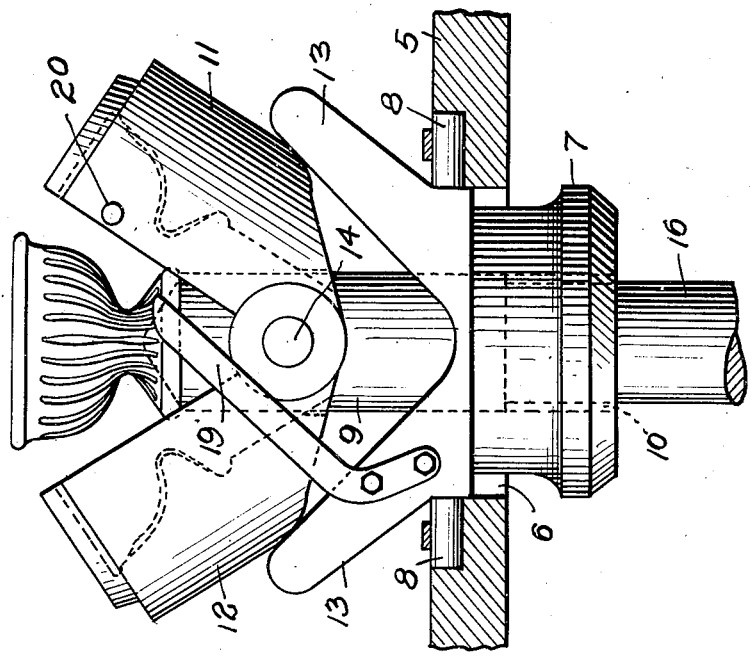
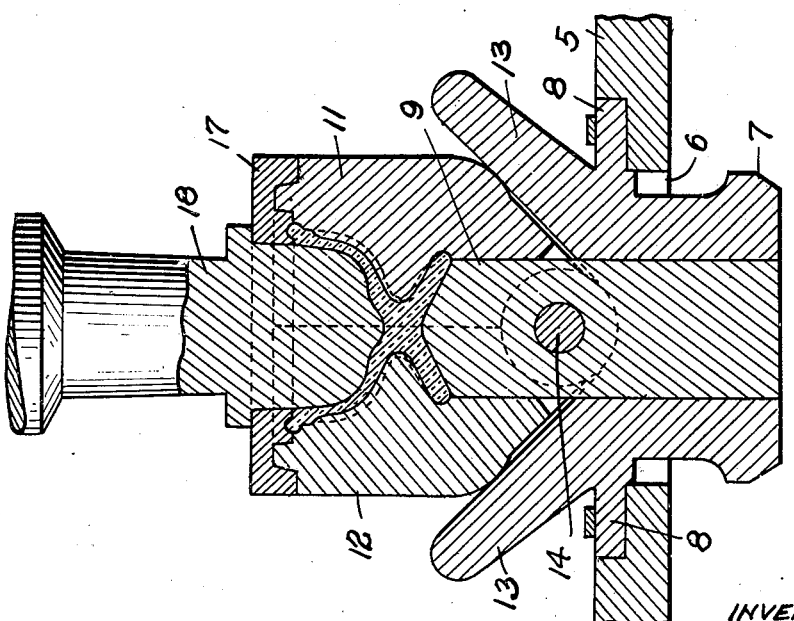
INVENTOR
Reuben Haley.
By Green and McCallister
His Attorneys
WITNESSES
J. Herbert Bradley.

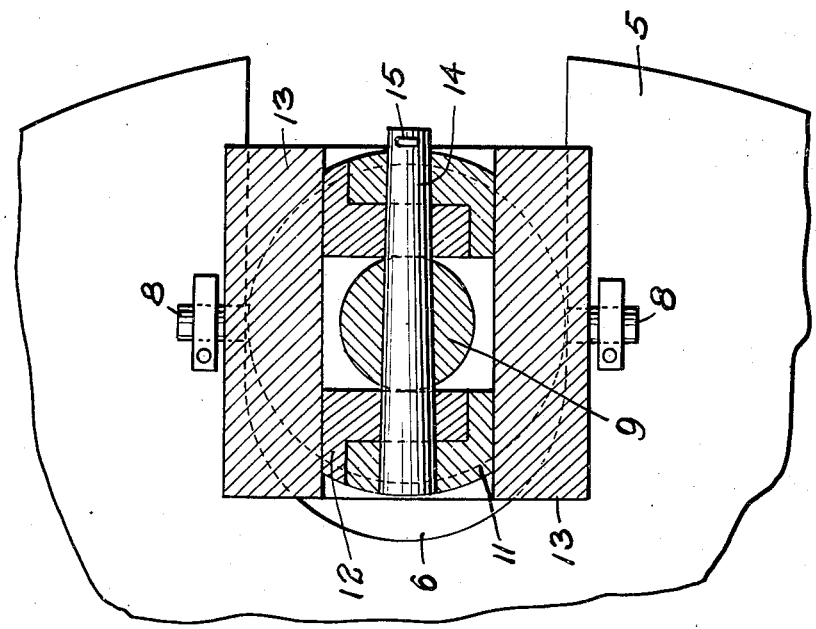
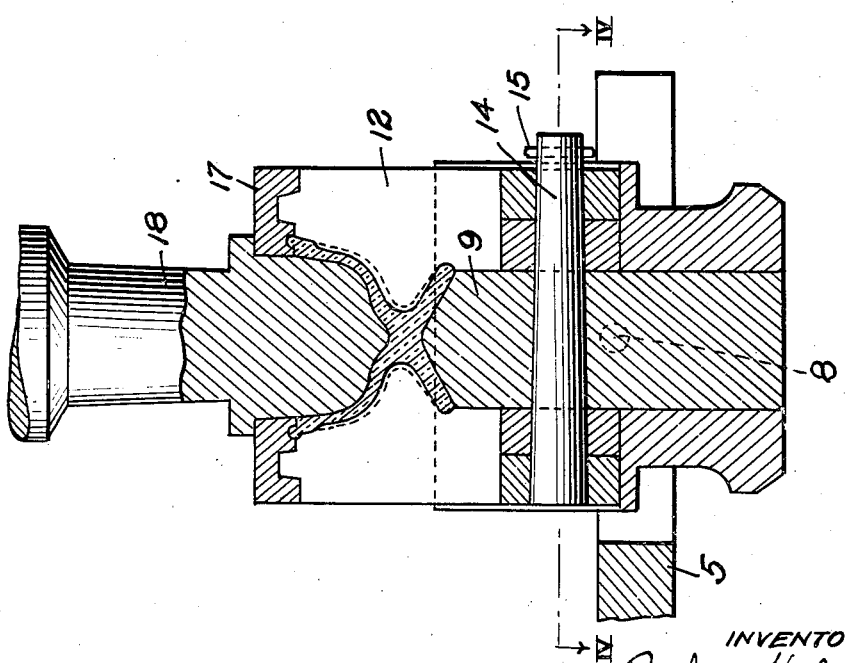

Patented Mar. 10, 1925.

1,529,622

UNITED STATES PATENT OFFICE.

REUBEN HALEY, OF BEAVER, PENNSYLVANIA.

SECTIONAL MOLD.

Application filed February 14, 1922. Serial No. 536,551.

*To all whom it may concern:*

Be it known that I, REUBEN HALEY, a citizen of the United States, and a resident of Beaver, in the county of Beaver and State of Pennsylvania, have made a new and useful Invention in Sectional Molds, of which the following is a specification.

This invention relates to molds for forming articles from glass or similar material and particularly to molds for use in connection with pressing machines.

An object of the invention is to produce a mold which may be employed in the manufacture of glass articles of irregular shapes and which is adapted to be utilized in connection with an automatic glass-pressing machine.

A further object is to produce a multipart mold capable of being used in conjunction with an automatic glass-pressing machine and adapted for use in molding articles such as compotiers, pitchers, cups, etc., or any article which will not deliver from a block mold.

In automatic machines, the mold is ordinarily tilted to deliver the pressed article. Tilting of the mold is not sufficient where an intermediate portion of the article molded is of less diameter than the end portions of the article or where the mold cavity is complex and not so formed that the article will fall free of the walls thereof when the mold is tilted. One of the features of my invention is to produce a mold for forming such articles and one adapted to accomplish the automatic release of the molded article when used in connection with an automatic machine such as an automatic press now commonly employed in the manufacture of tumblers, shallow dishes, small lenses, and similar articles.

In the drawings accompanying and forming a part hereof, Figure 1 is a vertical sectional view of a mold and associated apparatus embodying my invention. The section is taken on the longitudinal axis of the mold cavity.

Fig. 2 is a side elevation of apparatus embodying my invention in which the mold forming a part thereof is shown in the open position.

Fig. 3 is a sectional view of apparatus shown in Fig. 1, the section being taken at right angles to the section of Fig. 1.

Fig. 4 is a sectional view along the line IV—IV of Fig. 3.

In automatic presses, the molds are mounted on a mold table which ordinarily revolves in a step by step movement and is so arranged that each mold is successively moved to a charge-receiving position, a pressing position and an article-delivering position. A gather of molten glass is delivered to the mold while it occupies the charge-receiving position. The mold then moves to the pressing position in which a plunger of the proper contour enters the mold cavity and presses the charge of glass contained therein. As soon as the plunger lifts free of the mold, the mold is moved toward the delivery position and, upon reaching that position, is tilted to discharge the molded article therefrom or the molded article is pushed upwardly out of the mold. Apparatus embodying my invention is adapted to be employed with such a machine and is adapted to be automatically operated to release the pressed article from the mold cavity.

In the embodiment of the invention illustrated the mold proper is formed in three sections so arranged that movement imparted to one section will cause the other sections to move with relation thereto in such a way as to free the pressed article. This is accomplished in the apparatus illustrated by mounting one section so that it is movable in a guide formed in a mold support and by pivotally mounting the other sections thereto in such a way that movement of the first-mentioned section occasions a pivotal movement of the other sections with relation to the first section and an opening of the mold.

In the drawings, I have diagrammatically illustrated a mold table 5 provided with a recess 6 for the reception of a mold support 7. As shown, the mold support is mounted on the table by means of lugs or trunnions 8 in such way that it is located within the recess 6. A mold section 9 is slidably mounted in a vertical way 10 provided in the support 7. This section is preferably cylindrical and, as shown, its upper end forms the bottom wall of the mold cavity. Mold sections 11 and 12 are pivotally secured to the section 9 and are preferably symmetrically located with relation thereto. A portion of the mold cavity is formed in each section 11—12 and the point of pivotal connection between these sections and the section 9 is preferably located in an extension of the longitudinal axis of the mold cavity. As shown in the drawings, the mold support is provided with a V-shaped way formed by laterally projecting inclined arms 13 symmetrically located with relation to guide 10 in which the section 9 is mounted. The base portion of each section 11—12 is so formed that the bottom of the mold formed by these base portions substantially fits the V-shaped way of the support when the mold is in the closed position illustrated in Fig. 1. In Fig. 2, I have illustrated the positions assumed by the different parts of the mold when the section 9 is elevated or moved upwardly through the way 10. It will be apparent that the upward movement of the section 9 tends to lift the sections 11—12 off the support 7 but that the weight of these sections causes them to pivot around the pivotal point so that their upper ends move away from each other, whereas their lower outer edges slide along and are supported by the guiding arms 13 of the support 7. The mold cavity is of necessity so designed that the re-entrant portions of the wall thereof will swing free of the molded article as the sections 11—12 swing outwardly.

As shown in the drawings, the sections 11—12 are each pivotally mounted on a pin 14 which projects through a suitable aperture provided in the section 9. Each section 11—12 is preferably provided with two pin-engaging extensions and the pin 14 is preferably a tapered pin locked in place by any suitable means, such as a cotter 15. The section 9 is preferably of sufficient length to extend approximately to the bottom of the support 7 and during the operation of the press with which the apparatus is associated, its bottom face is adapted to be engaged by a plunger or so-called valve 16 located at the delivery station of the press and adapted to move upwardly for the purpose of lifting the section 9 to the position shown in Fig. 2 and of thereby swinging the sections 11—12 to a mold-opening position.

During the operation of the apparatus, the mold support 7, with the multi-part mold in place thereon, is properly mounted on the rotating table 5 of an automatic press. The co-operation of the support and the sections 11—12 holds the mold in the closed position for the reception of a gather of molten glass. After the gather has been delivered to the mold cavity, a mold ring 17 is located in place around the top of the mold and a plunger 18 is forced downwardly into the mold cavity. The mold ring is preferably of the usual type and is preferably so arranged as to positively lock the sections 11—12 in the closed position while it is in place. As shown in the drawings, this is accomplished by providing a tongue-and-groove connection between the mold ring and the sections 11—12. The mold ring shown forms a part of the mold cavity and, as is usual, cooperates with the plunger and the mold sections in the formation of the lip or edge around the molded article. The plunger 18 is withdrawn from the mold and the mold ring 17 is lifted in the usual manner.

When the valve 16 lifts the mold section 9, the motion of the section 9 is guided by the way 10 and is preferably such that the pivot pin 14 moves vertically. Under such conditions, the mold sections 11 and 12 are subjected to a lifting force at their inner edges; consequently, their weight causes them to tilt outwardly as they move upwardly with relation to the support 7. The arms are preferably symmetrically located and equally inclined with relation to the vertical axis of the mold cavity; consequently, they will limit and guide the outward tilting of the sections 11 and 12. In order to insure this outward tilting, I may employ a guide 19 for one or both of the sections 11 and 12 so arranged that it will engage a pin or shoulder 20 located near the top of the section and insure an outward swing as the section moves upwardly. In the drawings, I have shown the guide or a finger 19 secured to one of the arms 13 and extending in a direction substantially parallel to the other arm 13. This finger is adapted to engage a pin or shoulder 20 on the section 11 and to thereby insure outward tilting of the section as it moves upwardly. It will be understood that the arms 13 extend the entire length of the mold support and that a guiding finger 19 may be provided for each section 11—12.

As the valve 16 moves downwardly, the section 9 follows it and the mold sections 11—12 are caused to tilt inwardly toward each other as they move downwardly into the way formed by the inclined arms 13. When the section 9 reaches its lowermost position, the sections 11—12 occupy the mold closing positions and are held in that position by their weight and the co-operation of the inclined arms 13 and their inclined bases. During the operation of pressing, the force of the spring plate and plunger accentuates the action of gravity and therefore acts to hold the mold closed. It will be understood that three or more sections 11—12 may be pivotally secured to the central mold section 9 and that the mold support may be provided with guiding arms adapted to cooperate with the separate mold sections of such a mold for the purpose of guiding and controlling their outward swing.

While I have illustrated and described but one embodiment of my invention, it will be apparent that various changes, additions, modifications and omissions may be made in the apparatus illustrated without departing from the spirit and scope of the invention, as set forth by the appended claims.

I claim as my invention:

1. A multi-part mold comprising mold sections each having a part of the mold cavity formed therein, and means for pivotally securing the parts together at a single pivot point beyond one end of the mold cavity.

2. In combination in a multi-part mold, mold sections, each having a part of the mold cavity formed therein, and means located at one end of the mold cavity for holding said sections in fixed relative positions whereby they swing outwardly about a pivot point located in an extension of the longitudinal axis of the mold cavity to release the molded article from the mold cavity.

3. In combination with a mold support having guiding arms, a mold section forming a wall of the mold cavity and movable with relation to said support, and mold sections pivotally secured to said first section and to each other at a point located in an extension of the longitudinal axis of the mold cavity and guided by said arms during movement of said first mentioned section.

4. In combination with a mold support, a mold section movable in a way formed in said support, mold sections pivotally secured to said section and movable with relation thereto about a single pivot point and means on said support for guiding the motion of said last mentioned sections and for supporting said sections in a mold closing position.

5. In a multi-part mold, a mold section forming a wall of the mold cavity, mold sections hinged together and pivotally secured to said first mentioned section and a mold support for guiding the movement of said sections and for holding them in a mold closing position.

6. In a multi-part mold comprising a mold section, a plurality of mold sections forming therewith a mold cavity and pivotally secured thereto and to each other at a point located in an extension of the longitudinal axis of the mold cavity, in combination with a mold support for holding said sections in a mold closing position and means for moving said sections to a mold opening position.

7. A mold support having a mold section receiving way formed therein for holding mold sections in a mold closing position, in combination with a multi-part mold, the separate sections of which are pivotally secured together at a single pivot point and so weighted as to drop to a mold closing position in said way.

8. In combination, with a mold support, a multi-part mold, comprising a mold section forming a wall of the mold cavity, and two mold sections pivotally secured to said first section to turn about a single pivot point and each having a portion of the mold cavity formed therein, the pivot point of said last mentioned sections, being so located in an extension of the longitudinal axis of the mold cavity and the contour of the mold surface being such that said sections swing free of the molded article as they swing outwardly about their pivot points.

In testimony whereof, I have hereunto subscribed my name this 7th day of February, 1922.

REUBEN HALEY.